(12) United States Patent
Buckley et al.

(10) Patent No.: US 8,897,829 B2
(45) Date of Patent: Nov. 25, 2014

(54) CONTROLLING TRANSMIT POWER IN A WIRELESS DEVICE

(71) Applicant: NVIDIA Corporation, Santa Clara, CA (US)

(72) Inventors: Robert Buckley, Bristol (GB); Jonathan Lucas, Bristol (GB); Edward Charles John Andrews, Bristol (GB); Steve Allpress, Bristol (GB)

(73) Assignee: NVIDIA Corporation, Santa Clara, CA (US)

( * ) Notice: Subject to any disclaimer, the term of this patent is extended or adjusted under 35 U.S.C. 154(b) by 107 days.

(21) Appl. No.: 13/864,590

(22) Filed: Apr. 17, 2013

(65) Prior Publication Data

US 2014/0220905 A1    Aug. 7, 2014

Related U.S. Application Data

(60) Provisional application No. 61/759,690, filed on Feb. 1, 2013.

(51) Int. Cl.
*H04B 7/00* (2006.01)
*H04B 17/00* (2006.01)

(52) U.S. Cl.
CPC .................................. *H04B 17/0012* (2013.01)
USPC ..................... 455/522; 455/115.1; 455/67.11; 370/311

(58) Field of Classification Search
CPC .... H04B 1/525; H04B 15/00; H04B 7/18506; H04B 1/406; H04B 2215/068; H04B 15/02
USPC ............. 455/522, 115.1, 67.11, 67.13, 226.1; 370/311, 230, 277

See application file for complete search history.

(56) References Cited

U.S. PATENT DOCUMENTS

| | | | | |
|---|---|---|---|---|
| 5,832,387 | A * | 11/1998 | Bae et al. | 455/522 |
| 6,628,956 | B2 * | 9/2003 | Bark et al. | 455/522 |
| 6,879,572 | B1 * | 4/2005 | Ayyagari et al. | 370/335 |
| 6,879,840 | B2 * | 4/2005 | Razavilar et al. | 455/522 |
| 6,952,181 | B2 * | 10/2005 | Karr et al. | 342/457 |
| 8,514,771 | B2 * | 8/2013 | Das et al. | 370/318 |
| 8,619,680 | B2 * | 12/2013 | Morita et al. | 370/328 |
| 8,811,249 | B2 * | 8/2014 | Seo et al. | 370/311 |
| 8,818,442 | B2 * | 8/2014 | Seo et al. | 455/522 |
| 2006/0025158 | A1 * | 2/2006 | Leblanc et al. | 455/456.2 |
| 2007/0149238 | A1 * | 6/2007 | Das et al. | 455/522 |
| 2011/0280169 | A1 * | 11/2011 | Seo et al. | 370/311 |
| 2013/0230027 | A1 * | 9/2013 | Das et al. | 370/336 |

* cited by examiner

*Primary Examiner* — Minh D Dao

(57) ABSTRACT

One aspect provides a method of controlling transmit power in a wireless device, wherein a desired transmit power is determined as a result of detection of a receive signal parameter. The method comprises detecting a desired maximum transmit power and generating a sequence of attenuation factors. The sequence is generated by monotonically increasing a variable at a controlled rate between a starting value and the maximum transmit power. The method further comprises using each attenuation factor in turn to: (a) reduce the measured value of the received signal power; and (b) reduce a determined desired value of the transmit power, where the transmit power is continually reduced as the variable is increased.

20 Claims, 4 Drawing Sheets

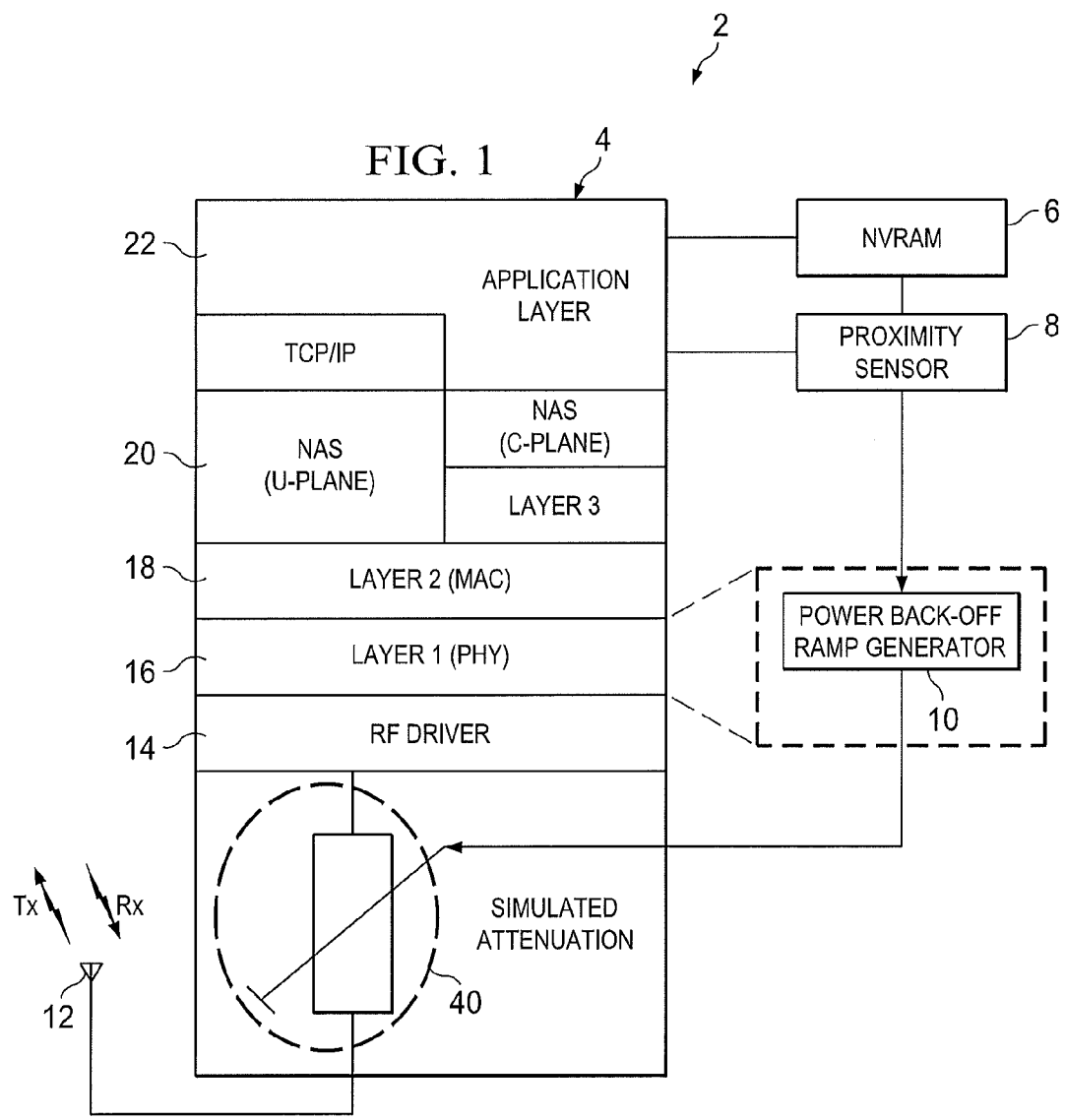

CONTROLLING TRANSMIT POWER IN A WIRELESS DEVICE

CROSS-REFERENCE TO RELATED APPLICATION

This application claims the benefit of U.S. Provisional Application Ser. No. 61/759,690, filed by Robert Buckley, et al. on Feb. 1, 2013, entitled "Controlling Transmit Power In A Wireless Device," commonly assigned with this application and incorporated herein by reference.

TECHNICAL FIELD

This application relates to controlling transmit power in a wireless device.

BACKGROUND

Wireless devices are designed to control the power at which they transmit wireless (RF) radio frequency (signals) to manage the behavior of the wireless device in a wireless communication system. For example, the wireless communication system may operate in accordance with certain standards which require minimum values for transmit power in order to conform to the standard. Moreover, the wireless device itself is designed to generate a wireless signal with a transmit power which ensures that sufficient but not excessive power if transmitted so that an adequate signal quality is received at a receiving wireless device to which the signal is transmitted. In order to achieve this a receiving device feeds back power control information to a transmitting device in a power control mechanism.

SUMMARY

One aspect provides a method of controlling transmit power in a wireless device, wherein a desired transmit power is determined as a result of detection of a receive signal parameter. The method comprises detecting a desired maximum transmit power and generating a sequence of attenuation factors. The sequence is generated by monotonically increasing a variable at a controlled rate between a starting value and the maximum transmit power. The method further comprises using each attenuation factor in turn to: (a) reduce the measured value of the received signal power; and (b) reduce a determined desired value of the transmit power, where the transmit power is continually reduced as the variable is increased.

Another aspect provides a wireless device. The wireless device comprises an interface, storage module, and processor. The interface receives a wireless signal and transmits a wireless signal with a desired transmit power determined as a result of detection of a parameter of the received signal. The storage module stores at least one desired maximum transmit power. The processor is connected to the interface and the storage module and erased to execute a computer program which carries out the steps of: generating a sequence of attenuation factors and using each attenuation factor. The sequence is generated by monotonically increasing a variable at a controlled rate between a starting value and the maximum transmit value. Each attenuation factor is uses to: (a) reduce the measured value of the received signal power; and/or (b) reduce a determined desired value of the transmit power, where the transmit power is continually reduced as the variable is increased.

Another aspect provides a computer program product comprising computer instructions recorded on a non-transmissible media or in the form of non-transmissible signals which, when loaded into a processor, causes the processor to implement a method of controlling transmit power. The method comprises generating a sequence of attenuation factors and using each attenuation factor. The sequence is generated by monotonically increasing a variable at a controlled rate between a starting value and the maximum transmit power. Each attenuation factor is used in turn to: (a) reduce the measured value of the received signal power and; (b) reduce a determined desired value of the transmit power, where the transmit power is continually reduced as the variable is increased.

BRIEF DESCRIPTION

Reference is now made to the following descriptions taken in conjunction with the accompanying drawings, in which:

FIG. 1 is a schematic diagram of a modem;

DETAILED DESCRIPTION

Figure 2A:
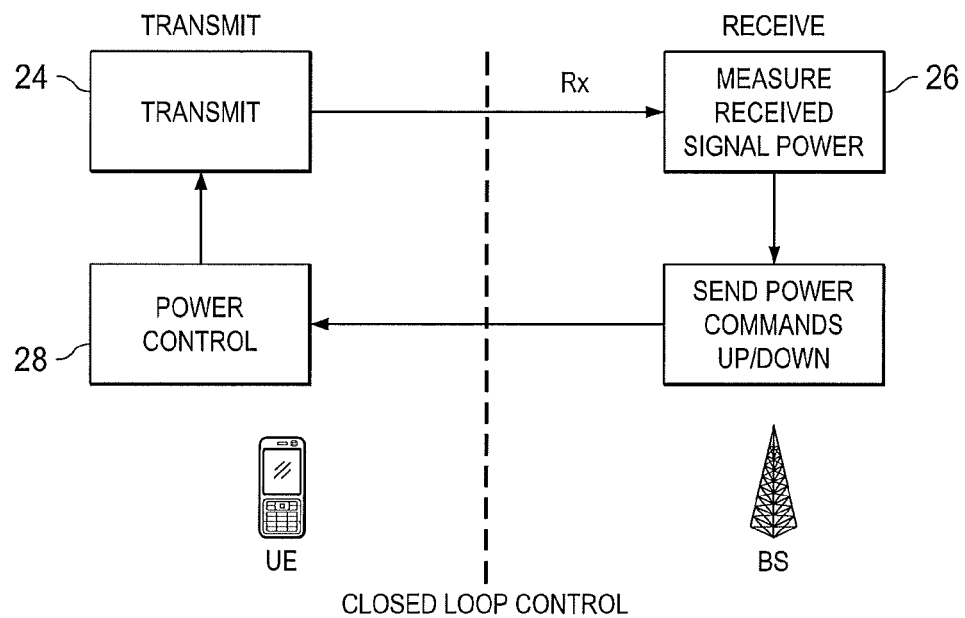
FIG. 2A is a block diagram of a closed loop power control mechanism.

FIG. 1 is a schematic block diagram of a modem in accordance with one embodiment of the present invention. The modem is equipped to limit the transmit power to meet external or internal constraints.

A good example of a requirement to limit Tx power is the Specific Absorption Rate (SAR) limits imposed by various regulatory bodies in order to limit RF exposure to the human body. SAR is a measure of the rate at which energy is absorbed by the body when exposed to an RF field. It is defined as the power absorbed per mass of tissue in units of watts per kilogram (W/kg). SAR is usually averaged either over the whole body, or over a small sample volume (typically 1 g or 10 g of tissue). SAR is a 'near field' effect, only relevant when a body part is physically close enough to the transmit antenna to absorb a significant fraction of the power it transmits. For electrically small antennae (less than half a wavelength), which are typical for portable wireless devices, this region extends out to approximately Lambda/2*PI where Lambda is the wavelength in free space. So for a mobile telephone transmitting at between 700 MHz and 2500 MHz, this region extends from zero to between approximately 2 cm (at 2500 MHz) and 7 cm (at 700 MHz) from the antenna. SAR test procedures reflect this, requiring the test body or probe to be positioned physically close to the transmit antenna.

For the example SAR requirement, solutions exist in which a modem has a proximity sensor which is used to trigger a reduction in an upper limit to its maximum transmitted power. The modem behaves as usual except that its maximum power is reduced when the device is close to another object. Such a scheme can be an effective way to meet SAR requirements, and at least makes some attempt to minimize the effect on the wireless system, in that the modem behavior is only affected when the device is close to another object. However, SAR requirements are often sufficiently stringent that in order to meet them, the maximum Tx power must be limited to below the minimum specified in the standards which govern the operation of the modem (e.g. 3GPP for cellular modems). Violating these standards can cause side effects beyond the reduction in range. The inventors have noted side effects including: dropped connections (even beyond what would be expected by the reduction in max Tx power), repeated failed connection attempts when out of range due to the limited Tx power, excessive signaling traffic due to inconsistent behavior 'confusing' base stations. The particular problem solved in the following is how to temporarily limit the maximum transmitted power of a wireless modem in a way that is simple to implement and minimizes unwanted effects on system behavior, even if such power limitation is below the minimum power allowed in the relevant modem standard.

The modem 2 comprises a processor 4 which controls the operation of the modem. A non-volatile memory 6 is connected to the processor 4. A proximity sensor 8 is also connected to the processor 4. Although the following described embodiment of the invention is described in the context of use of the proximity sensor, the concepts described herein have wider applicability. This will become apparent from the following explanation.

Reference numeral 10 denotes a power back-off ramp generator. This component can be implemented in hardware as shown, connected to the processor, or may be implemented in software within the processor as denoted schematically by the dotted line around component 10.

The modem 2 can take the form of any wireless transmitter. In particular, it can take the form of a dongle for plugging into a host terminal, or it may be implemented in a mobile phone handset. The function of the modem is to transmit and receive wireless signals for conveying data, including but not restricted to voice data in calls.

An antenna 12 connected to the modem 2 transmits (Tx) and receives (Rx) such wireless signals.

The processor 4 which controls operation of the modem 2 implements a software stack incorporating an RF driver layer 14, layer 1 (PHY-physical layer) 16, layer 2 (MAC-media access control) 18, layer 3 and NAS 20, and Application layer 22, including TCP (Transport Control Protocol)/IP (Internet Protocol) functionality. The operation of these layers will only be described herein to the extent that they have been modified by operation of embodiments of the present invention. Their operation in this respect will become apparent from the following description.

The RF driver 14 cooperates with layer 1 to control the transmit power ensuring that sufficient but not excessive power is transmitted to achieve an adequate receive signal quality. An RF receiver (39, FIG. 2C) in the RF driver layer 14 receives an incoming signal Rx signal and determines gain settings for the signal processing. Based on this, it reports a value, reported Rx level, to layer 1. As described more fully later, in the following embodiment, this reported level is adjusted by an attenuation factor.

FIG. 2A is a schematic block diagram indicating the main functional components of the 3GPP Wideband Code Division Multiple Access (WCDMA) receiver which implements such closed loop power control mechanism. FIG. 2A illustrates an uplink closed loop power control mechanism without the use of attenuation factors as described herein. On the transmit side a wireless device has a transmitter 24 which includes a power amplifier which can be controlled to modify the transmit power. A signal is transmitted to a receiving device. The receiving device measures the received signal power at block 26 and generates up/down power commands at block 29 which it sends to the transmitting device. As an example, the transmit device can be a UE incorporating a modem described herein, and the receiving device can be a base station in a wireless cellular communication system. The up/down commands are handled by a power control module 28 in the transmit device which generates a control signal for the power amplifier 24. A downlink (DL) closed loop power control mechanism may operate at the modem, which is a mirror of that shown in FIG. 2A.

Figure 2B:
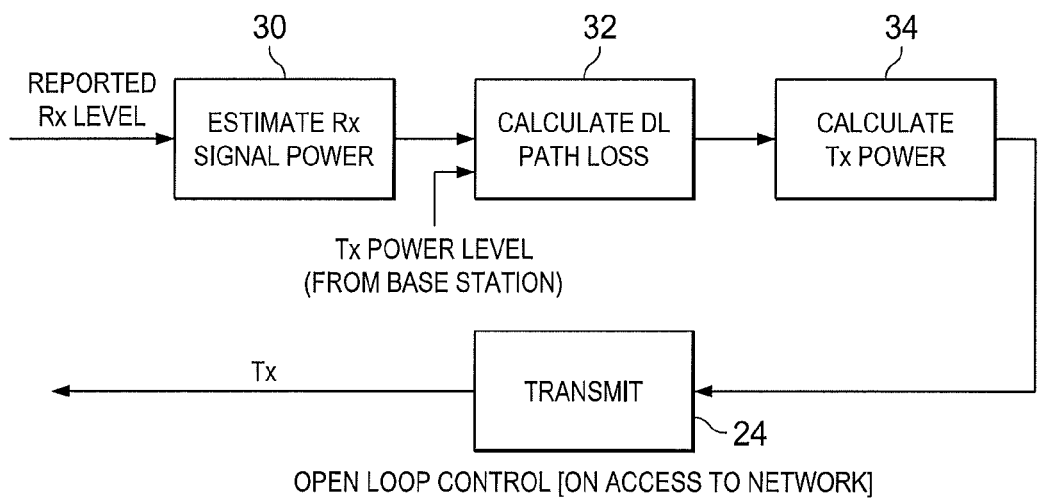
FIG. 2B is a block diagram of an open loop power control mechanism.

FIG. 2B is a schematic diagram of an open loop power control mechanism which operates for example, when the user equipment wishes to access a network. A receive signal is measured at block 30 and an indication of path loss is determined based on the signal measurements on block 32 by subtracting the estimated Rx signal from the Tx power level transmitted by the base station. This Tx power level is reported by the base station to the user equipment. The required power is calculated at block 34 based on an estimate of the path loss. The transmit power is then controlled from block 34 at the power amplifier 24.

Figure 2C:
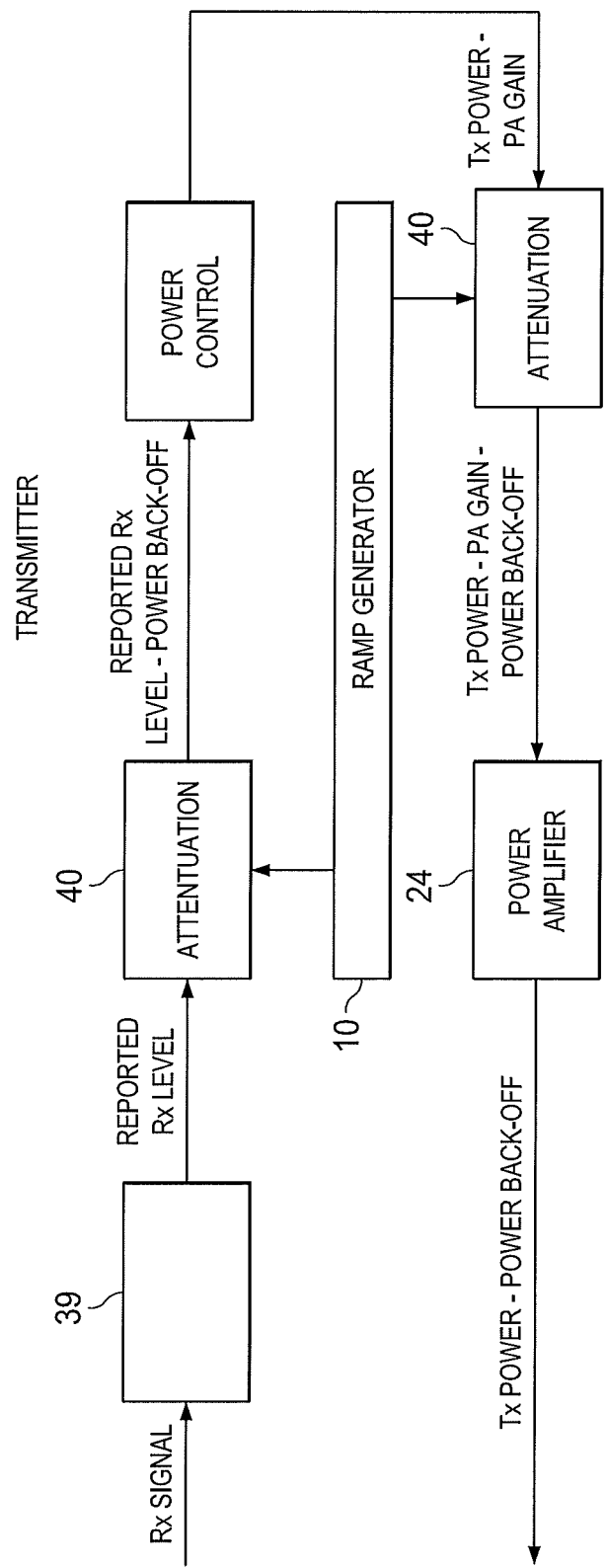
FIG. 2C is a schematic block diagram wherein attenuation factors are applied in the power control mechanism.

The power control mechanism is implemented herein to incorporate a simulated attenuation function 40: see FIG. 2C. This applies a simulated attenuation factor (referred to herein as "Pbackoff") to both the uplink (UL) and downlink (DL) path simultaneously. The attenuation factor reduces both the transmitted Tx power and the reported Rx level. As all estimates of the received signal level calculated in layer 1 are based on the reported Rx level, they are effectively reduced by Pbackoff when the attenuation factor is applied by the RF driver before reporting the level to layer 1.

Figure 3:
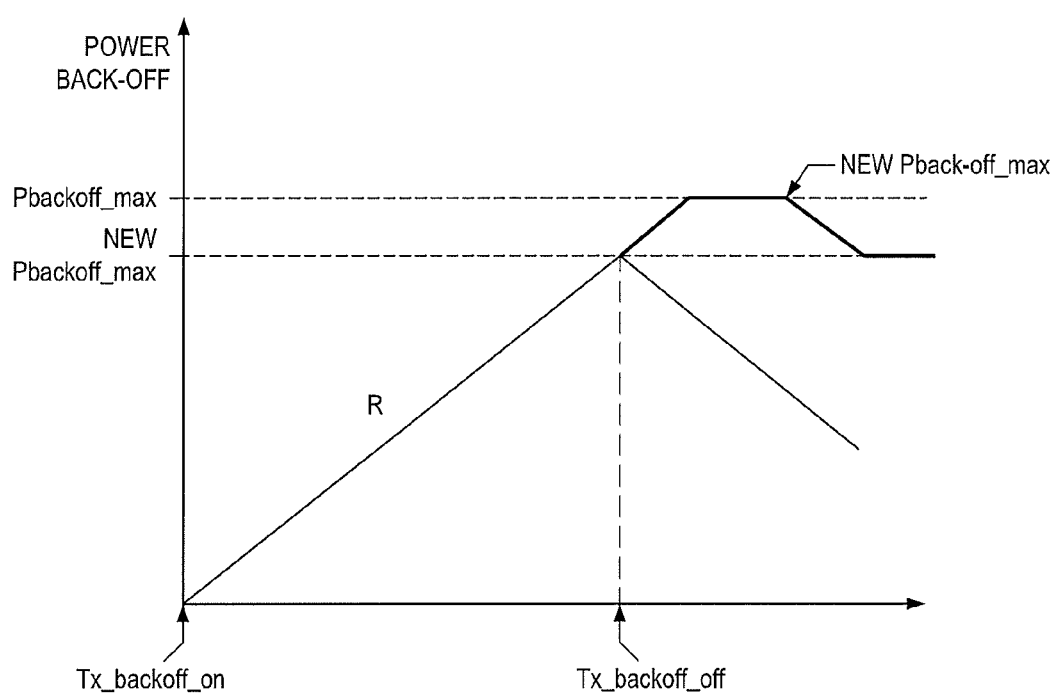
FIG. 3 is a graph showing change of the variable which generates the attenuation factors.

The attenuation factor is generated as follows. When the proximity sensor 8 is triggered/released, the application layer 22 sends a signal Tx_backoff_on/off (which is a digital, preferably binary signal) to the backoff ramp generator 10. This is referred to herein as a "trigger ramp signal". When the trigger ramp signal is received at the Pbackoff ramp generator 10, the ramp generator starts to increase an internal variable Pbackoff from 0 to a maximum value Pbackoff_max at a rate R. This is shown in FIG. 3. If the ramp R is not interrupted, it will reach and remain at the maximum value Pbackoff_max. However, the ramp may be interrupted by receipt of the signal Tx_backoff_off which is a trigger ramp off signal. This trigger ramp-off signal causes the variable Pbackoff to ramp towards 0 at the same rate R. If it is still ramping in one direction when it receives the opposite trigger signal, it reverses the direction of its ramp. The ramp trigger-off signal can be caused by the proximity sensor detecting that there is no longer an object close enough to require a reduced power to be transmitted.

The instantaneous backoff value Pbackoff is sent to the RF driver where it is used as the attenuation factor.

The maximum value Pbackoff_max is stored in the non-volatile memory 6.

In one embodiment, an array of maximum power backoff values Pbackoff_max is stored in the non-volatile memory 6. They can be read at boot time of the processor 4. The array may be parameterized to hold different Pbackoff values for different contexts, for example, by RF band and access technology (2G/3G/LTE, for example).

This allows the modem to operate in accordance with multiple RF bands and access technologies by using the appropriate Pbackoff_max value from the memory 6. When handing over or otherwise switching band/mode to one with a different Pbackoff_max value, the internal variable Pbackoff can be ramped towards the new Pbackoff_max value at rate R avoiding any instantaneous jump in Pbackoff, even if for a short period Pbackoff_max for the new band/mode is exceeded. This operation is shown in FIG. 3 where the timing of detection of the new maximum value is shown causing a ramped decrease in that value towards the new maximum value. Of course, if the new maximum value exceeds the original maximum value, the behavior of the system would not alter—the ramp would continue up to the new value unless it was interrupted by a ramp trigger-off signal.

When making measurements of a neighbor cell in a band/mode with a different Pbackoff_max value to that of the serving cell, reported signal strength is reduced by the current Pbackoff value. No adjustment is used to account for any difference between Pbackoff_max values of the serving and neighbor cells. This ensures any reported measurement of the neighbor cell is consistent both with measurements of the current serving cell and with measurements that would be reported immediately after any subsequent handover to that neighbor cell (which would then become the new serving cell).

Another facet of modem operation is the ability to control maximum block size which is transmitted. Transmitted block size can depend on the transmitted power available. It is generally handled in the MAC layer two 18. In this embodiment, the MAC layer two 18 may take Pbackoff into account when determining the maximum block size that can be transmitted close to the Tx power limit.

For some wireless standards including 3GPP WCDMA and E-UTRAN (LTE), transmit power may be reduced in certain operating modes where the peak-to-average ratio of the transmit signal is higher than usual. Transmitting a signal with a higher peak-to-average ratio demands a more linear RF power amplifier, which tends to increase current consumption. This so-called Maximum Power Reduction (MPR) relaxation allows power consumption of the RF power amplifier to be reduced in such cases by reducing the maximum transmitted power by the MPR allowance. If the MAC layer two 18 is aware that an attenuation factor is being applied as described herein, it could take that into account and does not have to apply MPR in addition, permitting a larger block size to be transmitted than would otherwise be the case.

Embodiments described above have the effect of simulating uplink attenuation by reducing Tx power throughout the Tx power range. This approach differs from that of applying a variable maximum limit only, which has the disadvantage of causing inconsistencies in modem behavior.

The embodiments have the effect of simulating downlink attenuation by reducing the apparent Rx signal level by the same amount as the uplink reduction, that is by the attenuation factor.

The rate R of the ramp is controlled to reflect the operation of the power control loops. In the above, it is described that the backoff ramp generator 10 sends the instantaneous backoff value to the RF driver. This can require limiting the slew rate R of the simulated attenuation change to allow the uplink and downlink power control loops to track it with acceptably small error.

As explained herein, the system operates to provide an additional variable attenuation in the Tx and Rx paths, along with a module (ramp generator 10) to ramp the backoff over time in response to a binary input signal (trigger ramp one/off). No intrusive changes are required to layer one or protocol stack modules which implement the details of the wireless standards.

Reverting to FIG. 2B, open loop Tx power calculations of the type shown in FIG. 2 and implemented for example in WCDMA PRACH, in which Tx power is calculated as a function of estimated DL path loss, behave correctly. The estimated DL path loss is increased by Pbackoff, and Tx power reduced by the same amount. In effect, both DL and UL path loss are increased by the same amount Pbackoff. For example:

WCDMA Initial PRACH TX Power=P-CPICH TX power−CPICH RSCP+Uplink Interference+Constant value [source 3GPP TS 25.331 8.5.7]

Also, the closed loop power calculations (FIG. 2A) behave correctly when the rate of change R of Pbackoff is controlled to a level which the uplink power control loop can follow. As an example, for WCDMA, the maximum rate of change of Tx power is 1 dB per slot of 666 uS so the maximum slew rate is controlled to be of the order of 1 dB per 6.66 ms or slower. In general terms, it is advantageous if the rate of change is at least ten times slower than the slowest power control loop. For UL closed loop power control, Pbackoff is applied to the transmit power after it has been determined by the up/down power commands received from the base station. For downlink closed loop power control, Pbackoff is applied to the reported Rx level which affects the received signal estimates used to generate the up/down power commands sent to the base station.

The effect on Rx measurements is minimized provided the rate of change of Pbackoff is limited to one which introduces acceptably small bias into Rx measurements during the ramp.

Other system behavior that depends on maximum UL power is also consistent. For example, as the simulated attenuation increases, some cells may become unreachable due to the reduced maximum Tx power: they would not hear the modem's RACH attempts. The reduction in reported Rx signal strength has a similar effect to increasing the values of thresholds that determine when the UE should attempt to reselect to other cells. This effective rise in the cell selection thresholds means the UE will not attempt to access a base station which is likely to be unable to RACH to, or could not hold a connection to due to its limited UL power. A UE already connected to a cell near the limit of range when backoff is applied will start attempting to reselect to other suitable cells (if any) as cell reselection thresholds effectively rise due to simulated DL attenuation.

The modem described herein helps to meet important regulatory safety requirements which are mandatory in many jurisdictions including the USA. It is also applicable to schemes to limit Tx power in order to limit battery current and/or thermal power dissipation, both of which are critical parameters for compact wireless products combining several high power subsystems.

Those skilled in the art to which this application relates will appreciate that other and further additions, deletions, substitutions and modifications may be made to the described embodiments.

What is claimed is:

1. A method of controlling transmit power in a wireless device, wherein a desired transmit power is determined as a result of detection of a receive signal parameter, the method comprising:
   detecting a desired maximum transmit power;
   generating a sequence of attenuation factors by monotonically increasing a variable at a controlled rate between a starting value and the maximum transmit power; and
   using each attenuation factor in turn to a) reduce the measured value of the received signal power; and b) reduce a determined desired value of the transmit power, whereby the transmit power is continually reduced as the variable is increased.

2. A method according to claim 1, wherein the step of detecting a desired maximum transmit power comprises receiving a trigger on signal indicating that a maximum transmit power is to be set.

3. A method according to claim 2, wherein the trigger on signal is received from one of a proximity sensor, battery current sensor, battery current calculation and thermal power sensor.

4. A method according to claim 1 comprising the step of storing a plurality of maximum transmit powers, each associated with a different context and selecting a desired maximum transmit power from the plurality based on the context.

5. A method according to claim 4, wherein the context is defined by operational frequency and/or mode of operation.

6. A method according to claim 1, wherein the variable is monotonically increased according to a ramp function.

7. A method according to claim 1, wherein the starting value is zero.

8. A method according to claim 1, comprising the step of detecting a new maximum transmit power and monotonically altering the variable from its current value at the time of detection of the new maximum transmit power to the new maximum transmit power.

9. A method according to claim 1 comprising the step of receiving a trigger off signal and reducing the variable at the controlled rate towards the starting value, wherein attenuation factors continue to be generated based on the variable.

10. A method according to claim 1, wherein the received value of the received signal parameter is a reported level of the received signal, wherein the received signal is detected by a driver layer and supplies the reported level to a power control module.

11. A method according to claim 1 when used in an open loop power control mechanism.

12. A method according to claim 1, when used in a closed loop power control mechanism on the uplink, wherein each attenuation factor is supplied in turn to reduce a determined desired value of the transmit power.

13. A method according to claim 1, when used in a closed loop power control mechanism on the downlink wherein each attenuation factor is applied in turn to reduce a received value of the received signal parameter.

14. A wireless device comprising:
an interface for receiving a wireless signal and transmitting a wireless signal with a desired transmit power determined as a result of detection of a parameter of the received signal;
a storage module storing at least one desired maximum transmit power; and
a processor connected to the interface and the storage module and erased to execute a computer program which carried out the steps of:
generating a sequence of attenuation factors by monotonically increasing a variable at a controlled rate between a starting value and the maximum transmit power;
using each attenuation factor in turn to a) reduce the measured value of the received signal power; and/or b) reduce a determined desired value of the transmit power, whereby the transmit power is continually reduced as the variable is increased.

15. A wireless device according to claim 14, which comprises a modem.

16. A computer program product comprising computer instructions recorded on a non-transmissible media or in the form of non-transmissible signals which when loaded into a processor causes the processor to implement a method of controlling transmit power,
generating a sequence of attenuation factors by monotonically increasing a variable at a controlled rate between a starting value and the maximum transmit power; and
using each attenuation factor in turn to a) reduce the measured value of the received signal power; and b) reduce a determined desired value of the transmit power, whereby the transmit power is continually reduced as the variable is increased.

17. A computer program according to claim 16, wherein the method comprises the step of detecting a desired maximum transmit power comprises receiving a trigger on signal indicating that a maximum transmit power is to be set.

18. A computer program according to claim 16, wherein the method comprises the step of storing a plurality of maximum transmit powers, each associated with a different context and selecting a desired maximum transmit power from the plurality based on the context.

19. A computer program according to claim 16, wherein the variable is monotonically increased according to a ramp function.

20. A computer program according to claim 16, wherein the method comprises the received value of the received signal parameter is a reported level of the received signal, wherein the received signal is detected by a driver layer and supplies the reported level to a power control module.

* * * * *